US008896424B2

(12) United States Patent
Reif et al.

(10) Patent No.: US 8,896,424 B2
(45) Date of Patent: Nov. 25, 2014

(54) DOSING SYSTEM AND METHOD FOR THE DOSING OF A MEDIUM

(75) Inventors: Oscar-Werner Reif, Hannover (DE); Reinhard Baumfalk, Göttingen (DE); Dieter Schmidt, Rosdorf (DE); Christian Oldendorf, Göttingen (DE); Swen Weitemeier, Adelebsen (DE)

(73) Assignees: Sartorius Lab Instruments GmbH & KG, Goettingen (DE); Sartorius Stedim Biotech GmbH, Goettingen (DE)

( * ) Notice: Subject to any disclaimer, the term of this patent is extended or adjusted under 35 U.S.C. 154(b) by 276 days.

(21) Appl. No.: 13/059,362

(22) PCT Filed: Nov. 5, 2009

(86) PCT No.: PCT/EP2009/007940
§ 371 (c)(1),
(2), (4) Date: Feb. 16, 2011

(87) PCT Pub. No.: WO2010/052002
PCT Pub. Date: May 14, 2010

(65) Prior Publication Data

US 2011/0148597 A1 Jun. 23, 2011

(30) Foreign Application Priority Data

Nov. 7, 2008 (DE) ........................ 10 2008 056 300

(51) Int. Cl.
*H04Q 5/22* (2006.01)

(52) U.S. Cl.
USPC ....... 340/10.5; 340/10.1; 340/10.2; 340/10.3; 340/10.4; 251/30.01; 251/129.01; 251/129.04

(58) Field of Classification Search
CPC ............ G06K 19/0723; G06K 7/0008; G07C 9/00111
USPC ........................................................ 340/10.5
See application file for complete search history.

(56) References Cited

U.S. PATENT DOCUMENTS

| | | | |
|---|---|---|---|
| 5,111,855 A | 5/1992 | Boeck et al. | |
| 7,052,603 B2 * | 5/2006 | Schick | 210/198.2 |
| 7,259,675 B2 | 8/2007 | Baker et al. | |
| 2001/0052530 A1 * | 12/2001 | Friedman | 222/518 |
| 2002/0117232 A1 | 8/2002 | Gisper-Sauch et al. | |

(Continued)

FOREIGN PATENT DOCUMENTS

| | | |
|---|---|---|
| DE | 60217201 | 11/2007 |
| EP | 0351681 A1 | 1/1990 |

(Continued)

OTHER PUBLICATIONS

English Language International Search Report dated Mar. 1, 2010.

*Primary Examiner* — George Bugg
*Assistant Examiner* — Anthony D Afrifa-Kyei
(74) *Attorney, Agent, or Firm* — Cohen & Hildebrand, PLLC

(57) ABSTRACT

A dosing system and a method for dosing a medium, having a dosing control unit (4), at least one exchangeable container (2) containing a medium to be dosed, and a dosing valve (3, 3') that can be connected to the container (2), wherein at least one part of the dosing valve (3, 3') that comes into contact with the medium is designed as an exchangeable system component (7, 10) and has a machine-readable code for identification purposes, wherein at least one container (2), as an exchangeable system component (2), has a machine-readable code for identification purposes, wherein the exchangeable parts (2, 7, 10, 19) that come into contact with the medium are designed as disposable parts, and wherein the dosing control unit (4) is connected with a communication unit (5) to read the codes, and wherein the communication unit (5) has a unique read connection (22) to each exchangeable system component (2, 7, 10, 19) or its code.

21 Claims, 7 Drawing Sheets

(56) References Cited

U.S. PATENT DOCUMENTS

Figure 1:
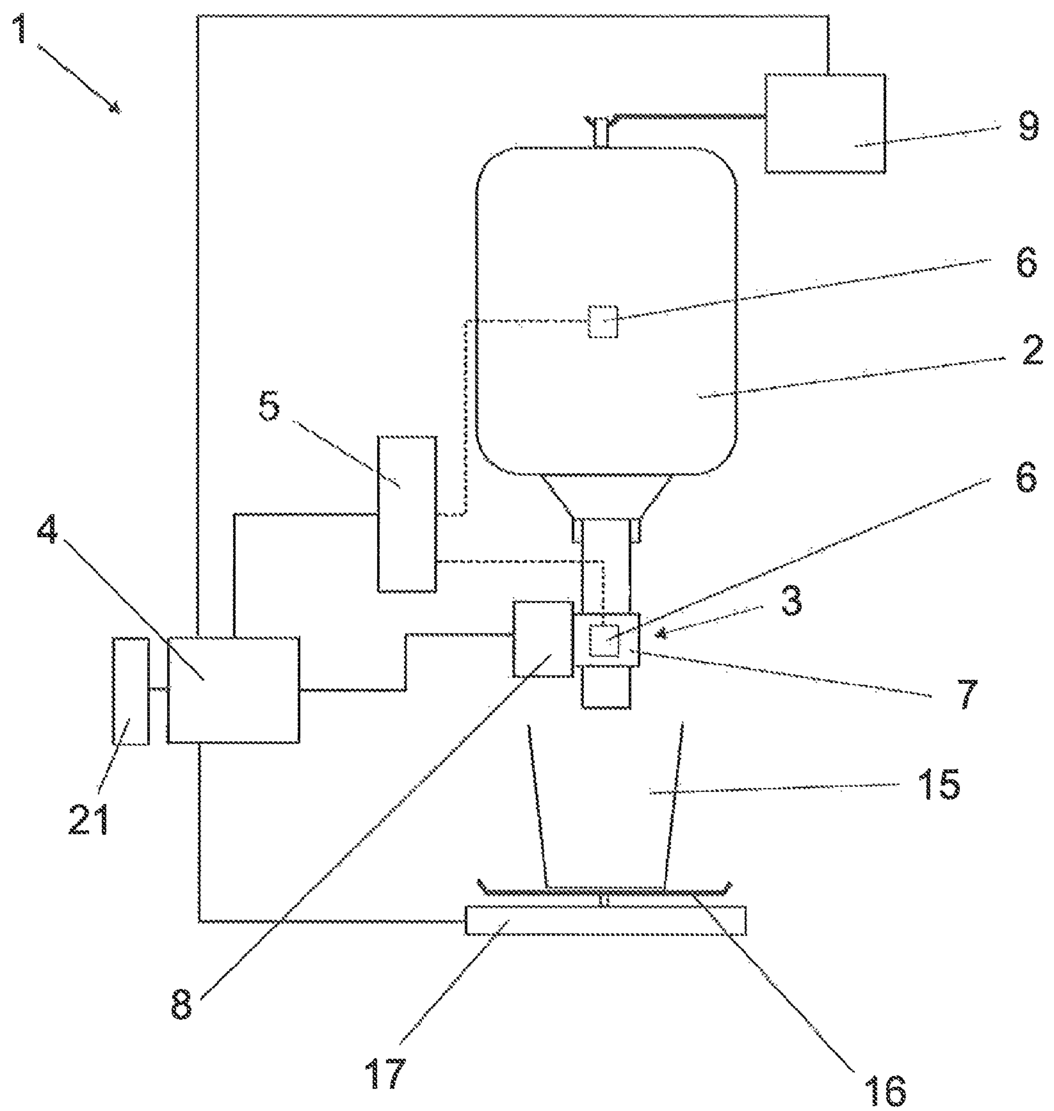

| | | | | |
|---|---|---|---|---|
| 2005/0205658 | A1 | 9/2005 | Baker et al. | |
| 2008/0116262 | A1* | 5/2008 | Majer | 235/381 |
| 2008/0173668 | A1* | 7/2008 | Bloechlinger et al. | 222/1 |
| 2009/0058600 | A1* | 3/2009 | Krepel et al. | 340/10.1 |
| 2009/0204250 | A1* | 8/2009 | Potyrailo et al. | 700/109 |
| 2010/0176156 | A1* | 7/2010 | Segers | 222/146.6 |

FOREIGN PATENT DOCUMENTS

| | | | |
|---|---|---|---|
| EP | 0461371 | a1 | 12/1991 |
| EP | 0726225 | A1 | 8/1996 |
| EP | 1950538 | A2 | 7/2008 |
| JP | 2001513404 | | 9/2001 |
| JP | 2003165117 | A | 6/2003 |
| JP | 2008110150 | | 5/2008 |
| WO | 9910028 | | 3/1999 |
| WO | WO 9910028 | A1 * | 3/1999 |
| WO | 0042969 | A1 | 7/2000 |
| WO | 2005107933 | A1 | 11/2005 |
| WO | 2007126948 | A2 | 11/2007 |
| WO | WO 2007126948 | A2 * | 11/2007 |

* cited by examiner

DOSING SYSTEM AND METHOD FOR THE DOSING OF A MEDIUM

BACKGROUND OF THE INVENTION

This is an application filed under 35 USC §371 of PCT/EP2009/007940, claiming priority to DE 10 2008 056 300.5 filed on Nov 7, 2008.

FIELD OF THE INVENTION

The invention relates to a dosing system having a dosing control unit, at least one exchangeable container containing a medium to be dosed, and a dosing valve that can be connected to the container.

The invention further relates to a method for dosing a medium arranged in an exchangeable container of a dosing system, said medium being supplied in a controlled manner by a dosing control unit to a dosing container, via a dosing valve connected to the container.

Dosing systems may comprise exchangeable system components, such as containers (e.g. bags) containing a medium to be dosed, and valves that can be connected to the containers.

Such dosing systems are used for mixing paints, fragrances, foodstuffs, pharmaceutical and biotechnological products.

DESCRIPTION OF RELATED ART

U.S. 2008/0173668 A1 describes a dosing system having a control and regulation unit, or dosing control unit, and a method that comprises at least one exchangeable container containing a medium to be dosed, as well as a dosing valve that can be connected to the container. Both the container and the dosing valve have an identification code that can be read by a communication unit. In this case, at least one property parameter or one condition-related parameter can be compared with at least one threshold value in the control and regulation unit or in a separate computer unit, and the dosing process can be interrupted if necessary.

It is disadvantageous that, in the known system, the amount dosed, the dosing time, and the volume to be dosed are determined and regulated in a somewhat complicated manner via flow parameters that have to be determined. A further disadvantage is the fact that when a large number of exchangeable system components are involved, their codes are read out via one common read connection to the communication unit, and this can result in errors.

From U.S. Pat. No. 7,052,603 B2 is known a dosing system in which several containers in the form of disposable bags containing a medium to be dosed are interconnected by a tubing system and connected via a pump to a target container. In this case, each disposable bag is provided downstream with its own dosing valve. The dosing valves and the pump are controlled by a dosing control unit.

The disadvantage here is that it is not possible to guarantee that, when a disposable bag is exchanged, in each case the correct and intended container will be connected up.

DE 602 17 201 D2 also discloses a dosing system with a dosing control unit in which several exchangeable containers or disposable bags are connected via a tubing system with a target container, for example a syringe, which at the same times forms a controllable pump. In this system the valves used are tubing pinch valves that are controlled by a dosing control unit.

This dosing system, too, exhibits the disadvantages described above.

From EP 1 950 538 A2 is known a dosing system for dosing paint components. The individual paint components are each supplied from a storage container to a(n) (intermediate) container that is fixedly installed and is connected to a scale. Using compressed air, the paint components are taken from their containers and supplied to a common target container in each case via an output line and a dosing valve connected thereto, and the weight of the target container is also monitored via a scale.

In this case, it is disadvantageous that when the storage containers are exchanged, the possibility of a mix-up occurring cannot be excluded. It is furthermore disadvantageous that additional, fixedly installed (intermediate) containers are needed as weighing containers that are each connected with a scale.

Furthermore, WO 00/42969 A1 discloses a device and a method for monitoring the quality and for establishing the identity of a liquid medium stored in a container, preferably a plastic bag. A bag-shaped container for storing blood, blood plasma, injection solutions or similar is fitted with a pouch that is in contact with the inside of the bag in which are arranged sensors for performing temperature measurements. Inside this pouch there is also provided an integrated circuit on which is arranged a processor unit that is connected with the sensors. A connection to a computer is provided via a communication interface.

It is disadvantageous in this case that, although the correct storage of the medium in the container can be monitored, it is not possible to monitor the further use of the container within a dosing system.

U.S. Pat. No. 7,259,675 describes a process equipment tracking system in which individual items of process equipment or system components, for example a pump that is connected with a container via a line, and a valve that is also connected with the container via a second line, each have a transponder or an RFID tag with a readable code. The codes can be read using a separate, manually operated reading device and can be stored in a database.

In this case it is disadvantageous that, while it is possible to verify whether the permitted and intended system components are present, it is not possible to verify whether they are arranged at the intended location, because the reader has to be taken by hand to the transponders. In particular, in the prior art device, when there are more than two system components with transponders it is no longer possible to determine the correct allocation, and the possibility of manual operating errors occurring cannot be excluded.

BRIEF SUMMARY OF THE INVENTION

It is the object of the present invention to improve the prior art dosing systems and dosing methods in such a way that it is ensured that only permitted system components intended for the dosing process are connected with each other. In particular, the aim is to provide better security of communication with the system components, as well as more security vis à vis the environment.

The task to be solved by the dosing system is solved by a dosing system having a dosing control unit, at least one exchangeable container containing a medium to be dosed, and a dosing valve that can be connected with the container, wherein at least one part of the dosing valve that comes into contact with the medium is designed as an exchangeable system component and has a machine-readable code for identification purposes, wherein at least one container, as an exchangeable system component, has a machine-readable code for identification purposes, wherein the exchangeable parts that come into contact with medium are designed as disposable parts, and wherein the dosing control unit is connected to a communication unit for reading the codes, and wherein the communication unit has a unique connection to each exchangeable system component or its code.

Because the part of the dosing valve that comes into contact with the medium is designed as an exchangeable system component and has a machine-readable code for identification purposes, the container—which is another exchangeable system component that also has a machine-readable code for identification purposes—can be read by the dosing control unit, with the aid of a communication unit, and the permissible use of the exchangeable system components can be verified.

In this way, it can be reliably prevented that unsuitable, unintended system components are used. Thus it can also be ensured, for example, that in order to maintain product purity dosing valves are always used only for one type of liquid or one medium.

The security of the communication is increased because the communication unit has a unique read connection to each exchangeable system component or its code. In this case, the read connection can be established in particular by a reading device or antenna allocated to, and arranged adjacent to, the code or the system component. As a result, above all when more than two exchangeable system components with codes are involved, reliable allocation of the system components and their codes can be achieved by the communication unit.

By designing the exchangeable parts as disposable parts it is possible to sterilize them and supply them in sterile packages. In addition, it is not necessary to clean the disposable parts and, furthermore, contamination of the environment by the medium can be better avoided.

The task faced by the dosing system is furthermore solved by a dosing system having a dosing control unit, at least one exchangeable container containing a medium to be dosed, and a dosing valve that can be connected to the container, wherein a plurality of containers are provided as exchangeable system components that are fixedly connected with the part of the dosing valve assigned to them that comes into contact with the medium, and wherein the containers or the parts of the dosing valves coming into contact with the medium each have a machine-readable code for identification purposes, and wherein the exchangeable parts coming into contact with the medium are designed as disposable parts, and wherein the dosing control unit is connected with a communication unit to read the codes, and wherein the communication unit has a unique read connection to each exchangeable system component or its code.

When the parts that come into contact with the medium are fixedly connected to their containers, in each case one code is sufficient to identify container and valve.

According to a further preferred embodiment of the invention, a pump is provided in which at least the part that comes into contact with the medium to be transported is designed as an exchangeable system component and has a machine-readable code.

This allows a pump or the part coming into contact with the medium being transported to be integrated into the dosing system as a further exchangeable system component, and also the permissibility of its use can be verified by the dosing control unit.

In accordance with a further preferred embodiment of the invention, the dosing control unit is connected to a system component memory in which at least the codes of the exchangeable system components can be stored. Storing the codes in a system component memory that is for example assigned to the dosing control unit means that the codes or identification data are available for documentation purposes even after system components have been exchanged.

According to a further preferred embodiment of the invention, dosing information that can assist the dosing control unit to control the dosing process can also be stored in the system component memory.

According to a further preferred embodiment of the invention, the coding takes the form of a bar code on a label. However, the coding may also be in the form of an identification code stored in an identification memory. The use of an identification memory has the advantage that the identification memory holding the code is not only readable but also writable via the communication unit. This also allows blocking notices to be entered that can prevent repeated non-permitted use in the identification memory.

According to a further preferred embodiment of the invention, the identification memory is designed as an EEPROM (Electrically Erasable Programmable Read-Only Memory) or as a transponder or RFID (Radio Frequency Identification) system.

According to a further preferred embodiment of the invention, the dosing valve consists of a separate valve part that can be integrated into a tubing system as a disposable part, and of a reusable actuator that can be controlled by the dosing control unit. The dosing valve may take the form of a pinch valve, flap valve, slide valve or a diaphragm valve.

The dosing valve may also be designed as a solenoid valve that is switched in a contactless manner, for example via a magnetic coil that encloses the solenoid valve. In this case, the magnetic coil can at the same time be used as the antenna of a transponder reading device.

According to a further preferred embodiment of the invention, the pump also consists of a separate disposable pump part that can be integrated into a tubing system, and of a reusable drive that can be controlled by the dosing control unit,.

According to a further preferred embodiment of the invention, the pump has a separate pump part in the form of an exchangeable tube of a peristaltic pump, or an exchangeable pump head of a centrifugal or piston pump, or of a diaphragm pump.

According to a further preferred embodiment of the invention, a scale that monitors the weight of the container is provided as a dosing sensor. However, it is also possible in addition to, or instead of this to arrange a target container receiving the medium to be dosed on a scale that constitutes a dosing sensor.

The advantage of this is that residual amounts contained in a feedline or tubing system downstream of the container cannot falsify the measurement result.

The task of the method is solved by a method for dosing a medium arranged in an exchangeable container of a dosing system, said medium being supplied to a target container, under the control of a dosing control unit via a dosing valve connected to said exchangeable container, wherein before the start of the dosing operation machine-readable codes that are arranged on exchangeable system components which come into contact with the medium and are designed as disposable parts are each read by a communication unit via in each case unique read connections, and the permissibility of using the system components having the codes is verified by the dosing control unit connected with the communication unit.

In this way, the use of unsuitable, non-intended system components can be reliably prevented. Thus it can also, for example, be ensured that in order to maintain product purity, dosing valves are always used only for one type of liquid or one medium. In the case of wrong or non-permitted system components, the dosing process can be discontinued or blocked and the event can be stored in the memory.

According to a preferred embodiment of the invention, in order to verify the permissibility of using system components (for example, once-only use, correct assignment of dosing valves and components, correct components), their codes are compared by the dosing control unit with data stored in a system component memory and/or an identification memory of the system components and/or in a database.

In the case of non-permitted system components, the dosing process is discontinued or blocked. When this happens, a blocking notice can be written at least in the memory assigned to the non-permitted system components. The blocking notice ensures that the non-permitted system components will not be used again.

The identification data of the container can be stored in the system component memory and/or the identification memory of the dosing valve connected to the container and/or in a database.

Dosing information about the dosing process can be stored, in particular for documentation purposes, in the system component memory and/or the identification memory and/or in a database. This makes it possible to trace the dosing process back to the manufacturer.

BRIEF DESCRIPTION OF THE SEVERAL VIEWS OF THE DRAWING(S)

Further details regarding the invention can be obtained from the following detailed description and the attached drawings, in which preferred embodiments of the invention are illustrated, by way of example.

Figure 2:
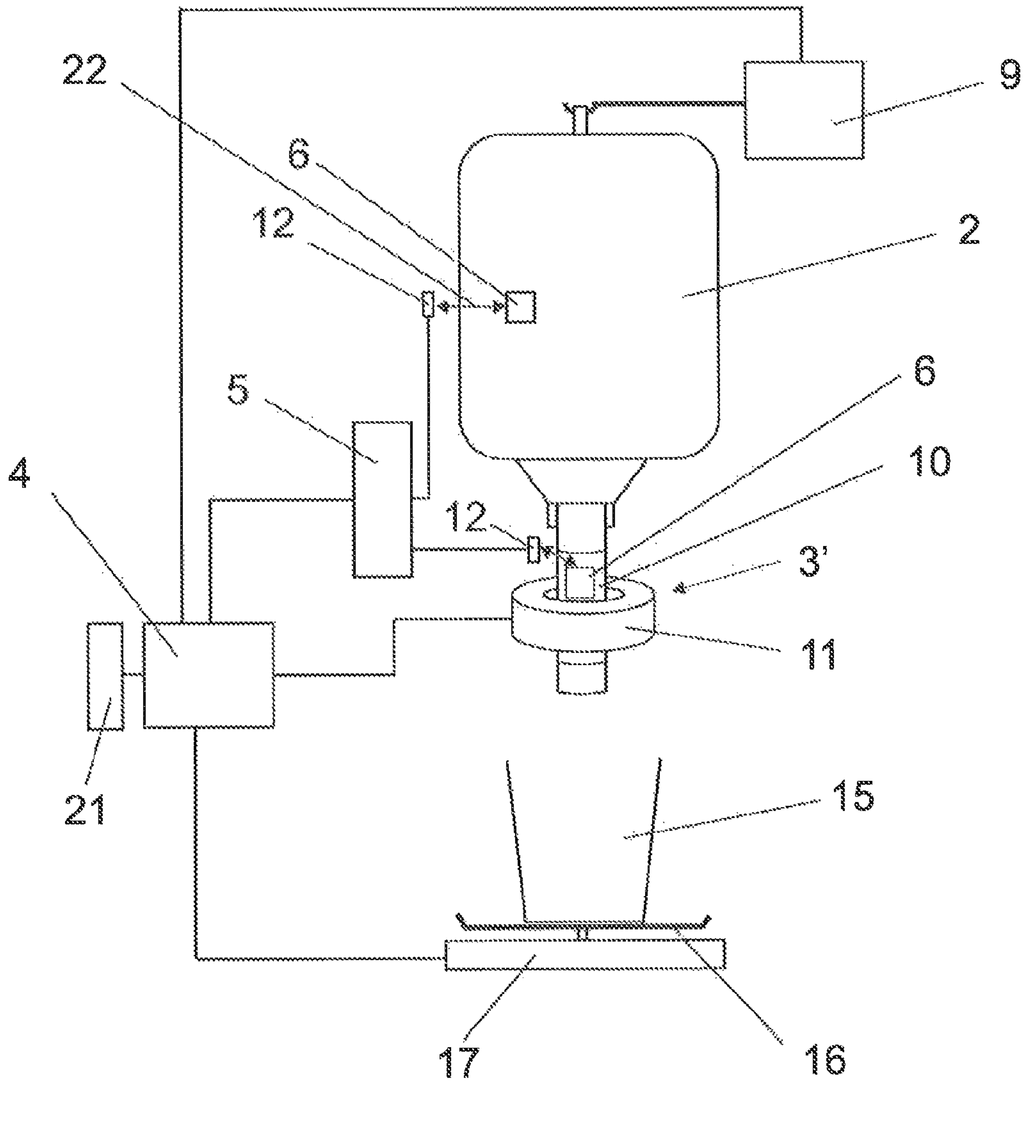
Figure 3:
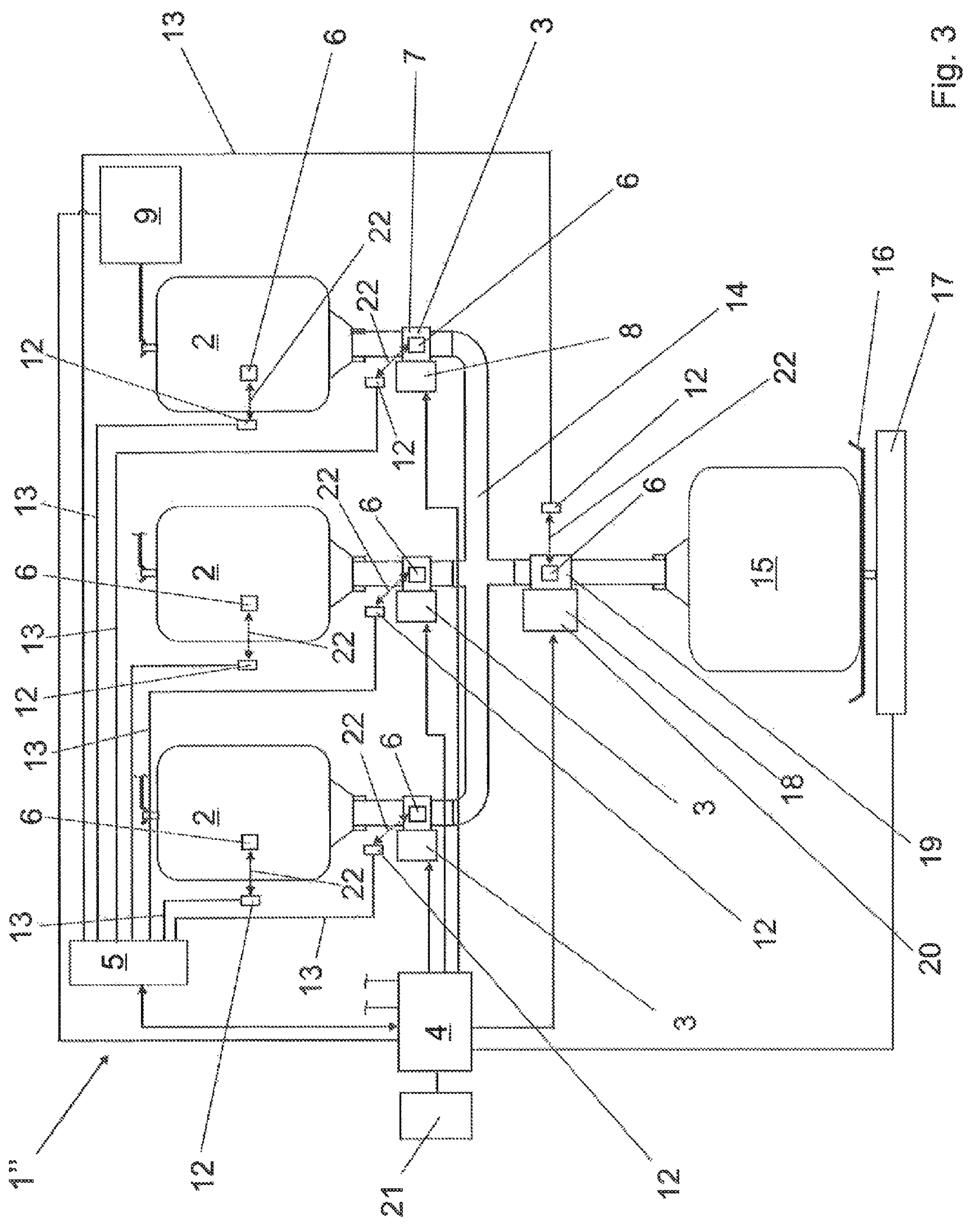

The drawings show:

FIG. 1: a diagrammatic view of a dosing system,

FIG. 2: a diagrammatic view of a further dosing system,

FIG. 3: a diagrammatic view of a dosing system with several containers, and

Figure 4:
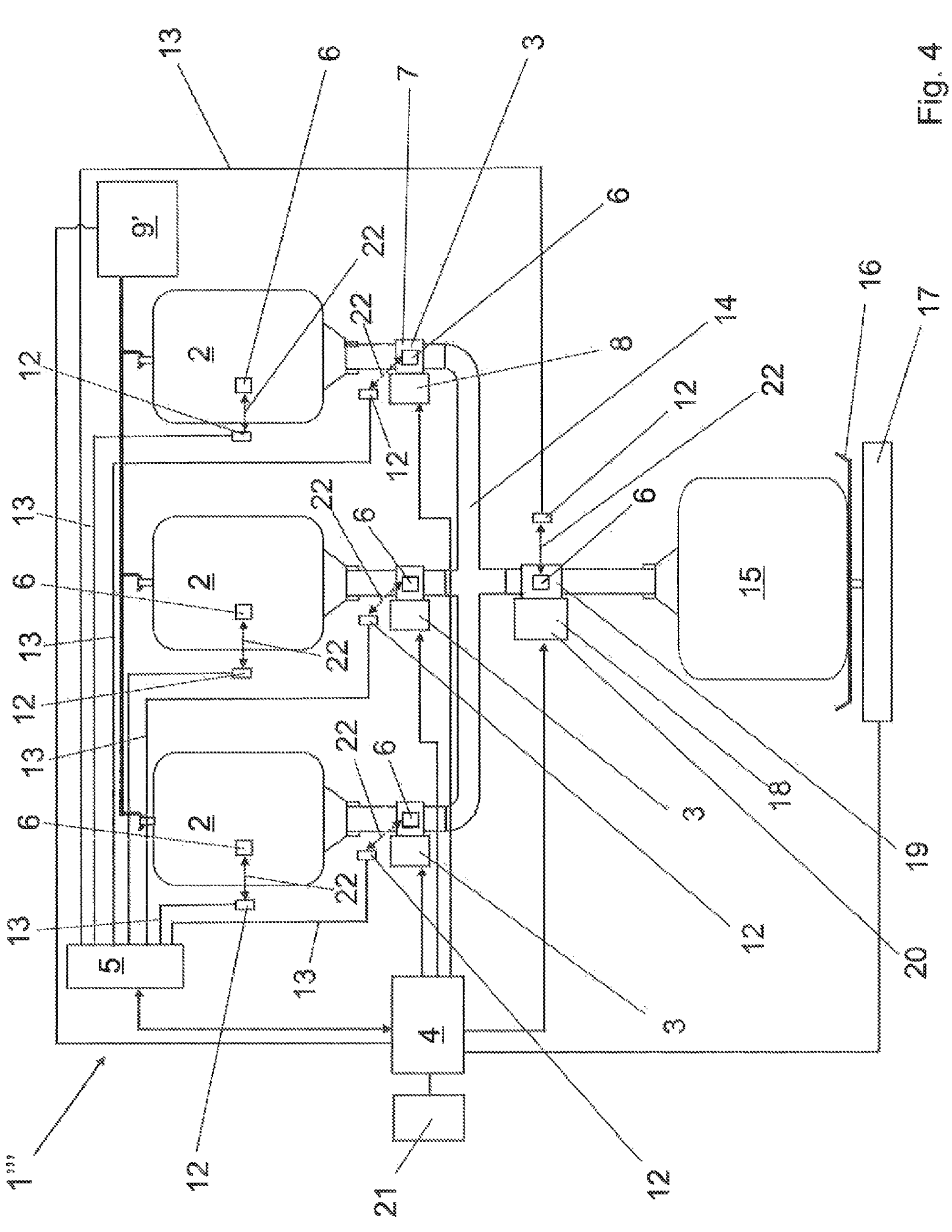
Figure 5:
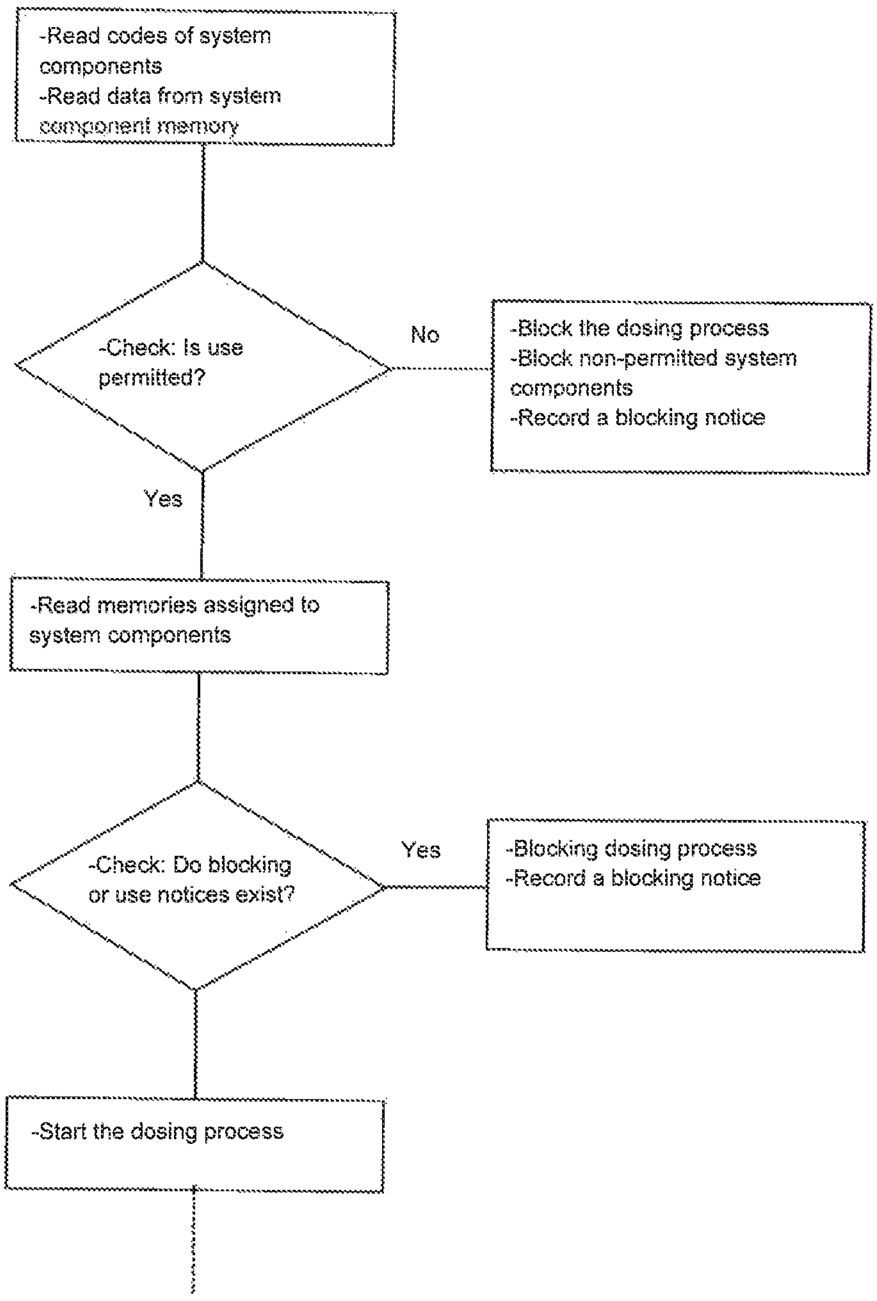
Figure 6:
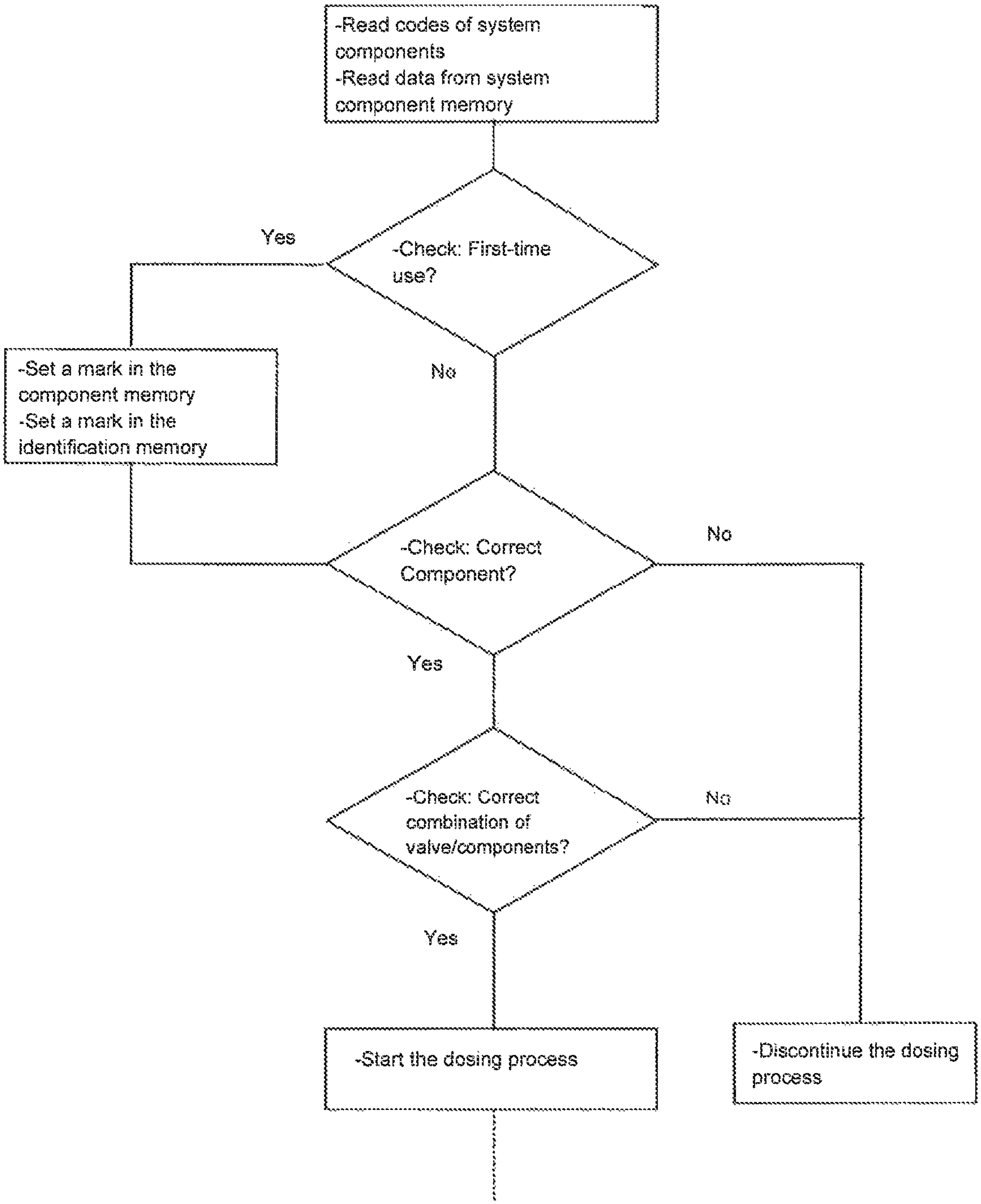
Figure 7:
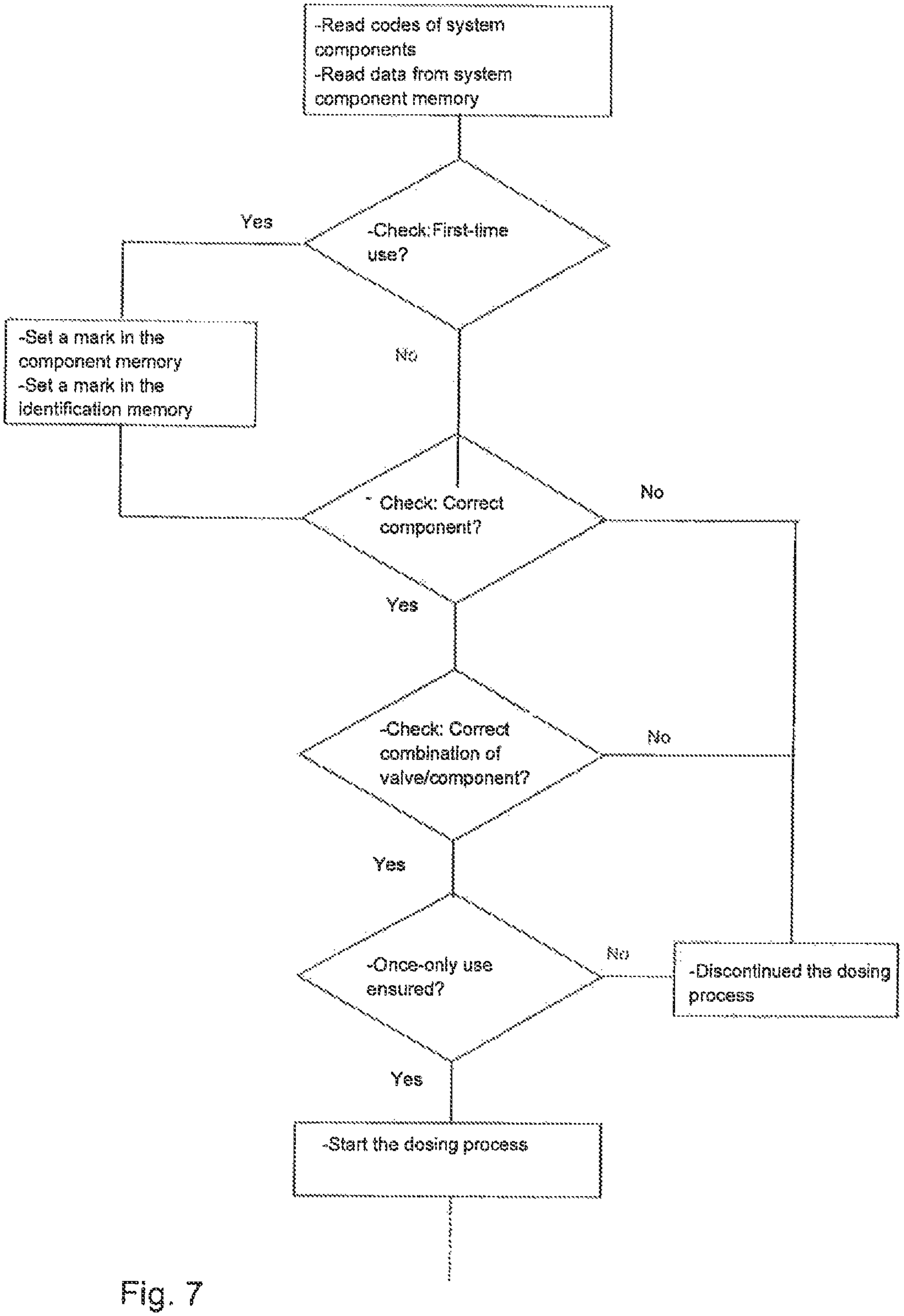

FIG. 4: a diagrammatic view of a dosing system with several containers arranged on the load arm of a common scale, FIG. 5: a diagrammatic view of a process sequence before the start of the dosing process, FIG. 6: a diagrammatic view of an alternative process sequence before the start of the dosing process, and FIG. 7: a diagrammatic view of a further alternative process sequence before the start of the dosing process.

DETAILED DESCRIPTION OF THE INVENTION

A dosing system 1 consists substantially of a container 2, a dosing valve 3, a dosing control unit 4 and a communication unit 5.

In accordance with the exemplary embodiment shown in FIG. 1, the container 2 and the dosing valve 3 each have an identification memory 6 with an individual machine-readable code for identification purposes. The identification memory 6 is preferably part of a transponder that is readable and also writable by the communication unit 5.

In the exemplary embodiments, the container 2 is depicted as a flexible disposable bag that contains the medium to be dosed and that constitutes an exchangeable system component.

The dosing valve 3 consists of a separate valve part 7 that comes into contact with the medium, that is designed for once-only use, and that constitutes an exchangeable system component, said valve also comprising a reusable actuator 8 that can be controlled by the dosing control unit 4.

The container 2 can be connected to a scale 9 that determines the weight of the container and acts as a dosing sensor that transmits the values which it determines to the dosing control unit 4.

The dosing valve 3' of the exemplary embodiment shown in FIG. 2 is designed as a solenoid valve 10 that bears the identification memory 6 and forms the exchangeable system component that comes into contact with the medium. The solenoid valve 10 is enclosed by a magnetic coil 11 that switches the solenoid valve 10 in a non-contacting manner and is connected to the dosing control unit 4.

In accordance with the exemplary embodiments shown in FIGS. 2, 3 and 4, the communication unit 5 has antennae 12 positioned in front of the identification memories 6, said antennae being connected in each case via wires 13 with the communication unit 5.

The exemplary embodiment shown in FIG. 3 depicts a dosing system 1" having a plurality of (for example, three) containers 2, which are connected via a tubing system 14 with a target container 15. The containers 2 may each be arranged on a scale 9 connected with the dosing control unit 4. In addition, or alternatively, the target container 15 is arranged on a weighing pan 16 of a scale 17 that is also designed as a dosing sensor and is connected to the dosing control unit 4. A pump 18 is arranged upstream of the target container 15, said pump having a separate pump part 19 for once-only use and, since it is an exchangeable system component, also having an identification memory 6, and having also a reusable drive means 20 that is controlled by the dosing control unit 4.

The exemplary embodiment shown in FIG. 4 depicts a dosing system 1''' having a plurality of (for example three) containers 2 that are arranged on a common load arm of the scale 9'. In this case, dosing must take place sequentially.

Before the dosing process starts, the codes of the system components 2, 7, 10, 19 as well as the corresponding data are read out of a system component memory 21 connected with the dose control unit 4, in accordance with FIGS. 5, 6 and 7.

By comparing the read-out data, a check is carried out to determine permissibility of use, i.e. if the data are in agreement, use is permitted, but if the data are not in agreement, use is not permitted.

If a non-permitted use of system components 2, 7, 10, 19 occurs, the dosing process is blocked or discontinued. In addition, the non-permitted system components can be blocked and a blocking note can be entered in the respective identification memory 6.

In addition, a blocking notice can be entered in the system component memory 21.

When the use of system components 2, 7, 10, 19 is permitted, further information is read from the memories assigned to the system components 2, 7, 10, 19, i.e. in particular from the identification memory 6. When this is done, a check is carried out for any possible blocking or use notices. If any such blocking or use notices exist, the dosing process is blocked and further blocking notices are entered. If no blocking or use notices are found, clearance is given to start the actual dosing process.

LIST OF REFERENCE NUMBERS

1, 1", 1''' Dosing system
2 Container
3, 3' Dosing valve
4 Dosing control unit 5 Communication unit
6 Identification memory
7 Separate valve part of 3
8 Actuator of 3
9, 9' Scale
10 Solenoid valve of 3'
11 Magnetic coil of 3'
12 Antenna of 5
13 Wire
14 Tubing system
15 Target container
16 Weigh pan
17 Scale
18 Pump
19 Pump part of 18
20 Drive of 18
21 System component memory
22 Read connection

The invention claimed is:

1. A dosing system with a dosing control unit (4), comprising at least one exchangeable container (2) for holding a medium to be dosed, a dosing valve (3, 3') connected to the at least one exchangeable container (2), at least a first part of the dosing valve (3, 3') that comes into contact with the medium is a first exchangeable system component (7, 10) and includes a first identification memory for storing only a first machine-readable code for first identification purposes, each of the first exchangeable system component (7, 10) and the at least one exchangeable container (2) being exchangeable independently of one another;

wherein the at least one exchangeable container (2) includes a second identification memory for storing only a second machine-readable code for second identification purposes, wherein the at least one exchangeable container and the first exchangeable system component are disposable independently of one another, wherein the dosing control unit (4) is connected to a communication unit (5) capable of reading the codes, wherein the at least first part of the dosing valve (3, 2') that comes into contact with the medium is disposable independently of the at least one exchangeable container, and wherein the communication unit (5) has a read connection (22) to the at least one exchangeable container and the first exchangeable system component for independently identifying the at least one exchangeable container and the first exchangeable system component based on the first machine-readable code or the second machine-readable code; wherein the first machine-readable code and the second machine-readable code represents only information for verifying permissibility of using the at least one exchangeable container and the first exchangeable system component with one another.

2. The dosing system according to claim 1, wherein the at least one exchangeable container comprises a plurality of exchangeable containers (2), wherein the plurality of dosing valves (3, 3') each having a first part suitable for contacting the medium, each connected to one of the plurality of exchangeable containers (2), the plurality of exchangeable containers are each fixedly connected to the dosing valve (3, 3') associated to each container, wherein each of the plurality of the exchangeable containers (2) or the first part of the dosing, valves (3,3') that come into contact with the medium, have only one machine- readable code for identification purposes, wherein the plurality of containers and the first part of the dosing valve that comes into contact with the medium are disposable parts, wherein the dosing control unit (4) is connected to a communication unit (5) for reading data codes, and wherein the communication unit (5) has a read connection (22) to each of the plurality of the exchangeable containers (2) or the part of the dosing valves or the data codes.

3. The dosing system according to claim 1, further comprising a pump (18) that includes a part which contacts the medium for transporting the medium and which part is an exchangeable system component and which includes a third machine-readable code.

4. The dosing system according to claim 1, wherein the dosing control unit (4) is connected to a system component memory (21) for storing at least the first machine-readable code and the second machine readable code.

5. The dosing, system according to claim 4, wherein dosing information is stored in the system component memory (21).

6. The dosing system according to claim 1, wherein the first machine-readable code and the second machine-readable code are bar codes on a label.

7. The dosing system according to claim 6, wherein the coding comprises identification codes stored in the first identification memory and the second identification memory (6).

8. The dosing system according to claim 7, wherein the first and second identification memory (6) containing the codes are writable via the communication unit (5).

9. The dosing system according to claim 3, wherein each identification memory (6) is an EEPROM or a transponder

10. The dosing, system according to claim 3, wherein the parts that contact the medium are sterilizable.

11. The dosing system according to claim 3, wherein the dosing valve (3, 3') comprises a second valve part which is disposable and which is integrated into a tubing system, and a reusable actuator (8) that can he controlled by the dosing control unit (4).

12. The dosing system according to claim 11, wherein dosing valve (3) is a pinch valve, flap valve, slide valve or diaphragm valve,

13. The dosing, system according to claim 12, wherein the pump (18) comprises a second pump part (19) which is disposable and which is integrated into the tubing system (14), and a reusable drive (20) which is controlled by the dosing control unit (4).

14. The dosing system according to claim 13, wherein the second pump part (19) includes an exchangeable rube of a peristaltic pump, or an exchangeable pump head of a centrifugal or piston pump or of a diaphragm pump.

15. The dosing system according, to claim 14, further comprising a target container (15) connected to the at least one exchangeable container, dosing sensors, a scale (9, 9') for monitoring the container by weight (2), and/or a second scale (17) for monitoring the weight of the target container (15).

16. A method for dosing a medium using the dosing system (1, 1', 1", 1'") according to claim 1, the method comprising the steps of supplying the medium to a target container (15) via the dosing valve (3, 3') connected to the at least one exchangeable container (2), controlling the dosing control unit (4), wherein prior to starting the dosing process, machine-readable codes arranged on the at least one exchangeable container (2) or the first exchangeable system component (7, 10) that come into contact with the medium and that are designed as disposable parts, are read by the communication unit (5) via in each case unique read connections (22), and the permissibility of using the at least one exchangeable container (2) or the first exchangeable system component (7, 10) having the codes is verified by the dosing control unit (4) connected to the communication unit (5).

17. The method according to claim 16, wherein, in order to verify the permissibility of using the at least one exchangeable container (2) or the first exchangeable system component (7,10) their codes are compared by the dosing control unit (4) with data stored in a system component memory (21) and/or in the identification memory (6) and/or in a database.

18. The method according to claim 17, wherein, in the case of non-permitted use of the at least one exchangeable container (2) or the first exchangeable system component (7, 10) the dosing process is discontinued.

19. The method according to claim 18, wherein in the case of non-permitted, use of the at least one exchangeable container (2) or the first exchangeable system component (7, 10) a blocking notice is written at least in the identification memory assigned to the non-permitted system components.

20. The method according to claim 17, wherein the second machine-readable code of the at least one exchangeable container (2) is stored in the system component memory (21) and/or the identification memory (6) of the dosing valve (3, 3') connected with the at least one exchangeable container.

21. The method according to claim 17, wherein dosing, information regarding the dosing process is stored in the system component memory (21) and/or the identification memory (6) and/or a database.

* * * * *

UNITED STATES PATENT AND TRADEMARK OFFICE

CERTIFICATE OF CORRECTION

PATENT NO. : 8,896,424 B2
APPLICATION NO. : 13/059362
DATED : November 25, 2014
INVENTOR(S) : Reif et al.

It is certified that error appears in the above-identified patent and that said Letters Patent is hereby corrected as shown below:

ON THE TITLE PAGE, item (73) should read

-- (73) Assignees: Sartorius Lab Instruments GmbH & Co. KG Goettingen (DE);
Sartorius Stedim Biotech GmbH, Goettingen (DE) --

Signed and Sealed this
Sixth Day of October, 2015

Michelle K. Lee
*Director of the United States Patent and Trademark Office*